United States Patent
Hartnack et al.

(10) Patent No.: US 6,849,351 B2
(45) Date of Patent: Feb. 1, 2005

(54) LOW-TEMPERATURE FUEL CELL

(75) Inventors: Herbert Hartnack, Erlangen (DE); Josef Lersch, Heroldsbach (DE); Arno Mattejat, Bubenreuth (DE); Karl Strasser, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 33 days.

(21) Appl. No.: 10/451,238

(22) PCT Filed: Dec. 10, 2001

(86) PCT No.: PCT/DE01/04637

§ 371 (c)(1),
(2), (4) Date: Jun. 20, 2003

(87) PCT Pub. No.: WO02/50935

PCT Pub. Date: Jun. 27, 2002

(65) Prior Publication Data

US 2004/0048135 A1 Mar. 11, 2004

(30) Foreign Application Priority Data

Dec. 20, 2000 (DE) .......................... 100 63 720

(51) Int. Cl.[7] ................................................. H01M 8/02
(52) U.S. Cl. ............................. 429/12; 429/33; 429/34
(58) Field of Search .............................. 429/12, 33, 34

(56) References Cited

U.S. PATENT DOCUMENTS

| | | | | |
|---|---|---|---|---|
| 4,950,562 A | * | 8/1990 | Yoshida et al. | 429/32 |
| 5,366,823 A | | 11/1994 | Leonida et al. | 429/34 |
| 5,747,185 A | | 5/1998 | Hsu | 429/44 |
| 5,770,033 A | | 6/1998 | Murphy et al. | 205/464 |
| 6,737,186 B2 | * | 5/2004 | Janousek et al. | 429/30 |
| 2003/0059335 A1 | * | 3/2003 | Quadadakkers et al. | 420/40 |

FOREIGN PATENT DOCUMENTS

| | | | |
|---|---|---|---|
| DE | 196 49 456 A1 | 6/1998 | H01M/8/12 |
| DE | 197 32 859 C1 | 11/1998 | H01M/8/00 |
| EP | 0 412 655 A2 | 2/1991 | H01M/2/06 |
| EP | 0 889 536 A1 | 1/1999 | H01M/8/02 |
| JP | 09 035745 | 2/1997 | H01M/10/39 |

* cited by examiner

*Primary Examiner*—John S. Maples
(74) *Attorney, Agent, or Firm*—Harness, Dickey & Pierce P.L.C.

(57) ABSTRACT

The composite conductor plate of a low-temperature fuel cell poses the following problem: it must be extremely corrosion-resistant to pure oxygen that is humidified by water and to pure hydrogen and must at the same time be able to be processed mechanically. To solve the problem, a composite conductor plate contains 50 to 60 wt. % Ni, 12 to 22 wt. % Cr, 10 to 18 wt. % Mo, 4 to 10 wt. % Fe and 0.5 to 5 wt. % W.

34 Claims, 1 Drawing Sheet

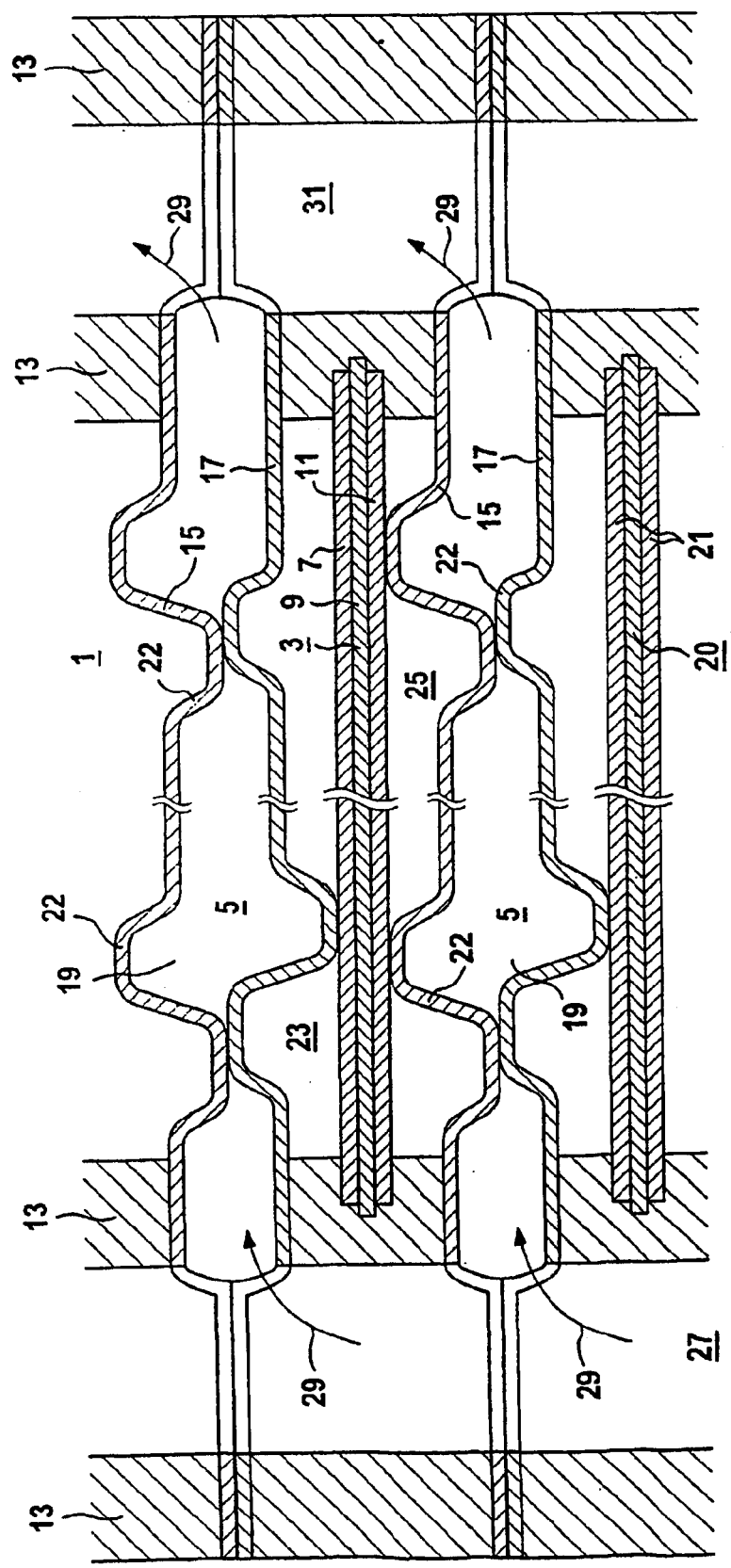

LOW-TEMPERATURE FUEL CELL

This application is the national phase under 35 U.S.C. § 371 of PCT International Application No. PCT/DE01/04637 which has an International filing date of Dec. 10, 2001, which designated the United States of America and which claims priority on German Patent Application number DE 100 63 720.5 filed Dec. 20, 2000, the entire contents of which are hereby incorporated herein by reference.

FIELD OF THE INVENTION

The invention generally relates to a low-temperature fuel cell. Preferably, it relates to one having an electrode and an interconnector plate, which electrically connects the electrode to an electrode of an adjacent low-temperature fuel cell.

BACKGROUND OF THE INVENTION

In a fuel cell, electrical energy and heat am generated by bringing together hydrogen ($H_2$) and oxygen ($O_2$) in an electrochemical reaction. For this purpose, hydrogen and oxygen are fed to the fuel cell, either in their pure form or as fuel gas containing hydrogen and as air. The type of operating gases which are fed to the fuel cell is substantially dependent on the operating environment in which the fuel cell is operated. A fuel cell of a fuel cell system which is operated, for example, in a hermetically sealed space is usually operated with pure oxygen and pure hydrogen. While the fuel cell is operating, these operating gases react to form water ($H_2O$) substantially without any residue, with the result that the fuel cell system generates virtually no exhaust gases.

Depending on their operating temperature, fuel cells are classified as low-temperature, medium-temperature and high-temperature fuel cells, and these categories can in turn be distinguished from one another by virtue of various technical embodiments. A low-temperature fuel cell is understood as meaning a fuel cell which is operated in a temperature range of up to 200° C.

In the case of a fuel cell stack which is assembled from a large number of planar fuel cells, at least one electrolyte electrode assembly, a further interconnector plate, a further electrolyte electrode assembly, a further interconnector plate, etc. are located beneath an upper interconnector plate which covers the fuel cell stack. The electrolyte electrode assembly in this case includes two electrodes, an anode and a cathode, and an electrolyte which is arranged between anode and cathode and is designed as a membrane. In this case, in each case one electrolyte electrode assembly located between two adjacent interconnector plates, together with the interconnector plates which bear against it directly or indirectly on both sides, forms a fuel cell. An interconnector plate is used, inter alia, to electrically connect an electrode of a fuel cell to the electrode of the adjacent fuel cell which bears against the interconnector plate; the electrodes do not have to bear directly against the interconnector plate, but rather may be electrically connected to it, for example by means of contact or protective layers.

The anode gas space of the fuel cell is formed between the anode of a fuel cell and the interconnector plate which adjoins the anode. While the fuel cell is operating, hydrogen ($H_2$) or hydrogen-containing operating gas flows through the anode gas space. On the other side of the interconnector plate is the cathode gas space of the adjacent fuel cell, which is formed between the interconnector plate and the cathode of the adjacent fuel cell. While this fuel cell is operating, oxygen or oxygen-containing operating gas flows through the cathode gas space.

In particular in the case of operation with pure oxygen and pure hydrogen, the interconnector plate is exposed to extremely corrosive operating gases. In addition, in some low-temperature fuel cells, in particular in polymer electrolyte membrane fuel cells (PEM fuel cells), the operating gases are humidified. Therefore, the interconnector plate is exposed not only to the operating gases but also to water. Water and, for example, pure oxygen form an extremely aggressive medium at the operating temperature of low-temperature fuel cells.

WO 00/59056 has disclosed a fuel cell having an interconnector plate made from a chromium-based alloy. However, an interconnector plate of this type has the drawback of being relatively brittle. It is therefore difficult to deform and has very poor welding properties, and moreover must be made relatively thick if the required stability is to be achieved.

SUMMARY OF THE INVENTION

An object of an embodiment of the present invention is to provide a low-temperature fuel cell having an interconnector plate which is particularly resistant to corrosion and has good mechanical processing properties.

An object may be achieved by a low-temperature fuel cell in which the interconnector plate comprises 50 to 65% by weight of nickel, 12 to 22% by weight of chromium, 10 to 18% by weight of molybdenum, 4 to 10% by weight of iron and 0.5 to 5% by weight of tungsten.

An interconnector plate assembled in this manner is very resistant to corrosion caused by oxygen even in combination with water and at elevated temperatures. Moreover, an interconnector plate of this type is very easy to deform mechanically. For example, it can be converted into the desired shape by simple bending without any cracks being formed and desired shapes, channels or spacers can be formed into it, by way of example, by the deep-drawing process. Moreover, an interconnector plate made from the abovementioned materials can be welded successfully by means of various processes and can easily be connected in a gastight manner to adjacent components.

A further advantage which should be mentioned is that the interconnector plate is gastight and does not become brittle in a hydrogen environment. Moreover, it is particularly successful at discharging current and heat.

In an advantageous configuration of an embodiment of the invention, the interconnector plate includes two metal sheets which form a cavity, in which case the interconnector plate, in an expedient configuration, may include substantially only the metal sheets which form the cavity. The abovementioned choice of material for the interconnector plate indicates that it is not necessary to produce the interconnector plate in a compact form for stability reasons. Moreover, the material used for the interconnector plate is sufficiently hard and elastic for two thin metal sheets which form a cavity to impart sufficient stability to the interconnector plate. The cavity may in this case be designed with feed and discharge passages, in such a manner that while the fuel cell is operating it serves as a cooling water space through which cooling water or heating water flows. This is particularly advantageous especially for low-temperature fuel cells, since in fuel cells of this type considerable amounts of heat have to be dissipated from the fuel cell. An interconnector plate which comprises two metal sheets forming a cavity and through which cooling water flows solves this problem in a simple and effective way. Moreover, the interconnector plate has sufficient stability to be able to cope with even pressurized cooling water without there being any risk of cracks or leaks being formed.

In the region of the cavity, the metal sheets expediently have a thickness of between 0.08 mm and 0.3 mm. The abovementioned particular choice of material makes it possible to produce the metal sheets for the interconnector plate in a particularly thin form yet with sufficient stability. Moreover, the elasticity and simultaneous tensile strength of the material prevents the cavity of the interconnector plate from exploding even when there is a pressure difference of a few bar between the environment inside the cavity and the environment outside the cavity. The extremely low thickness of the metal sheets means that particularly good heat transfer between the gas spaces and the cavity in the interconnector plate is ensured.

In a further advantageous configuration of an embodiment of the invention, the low-temperature fuel cell is suitable for operation with pure oxygen and pure hydrogen. An interconnector plate as described above has very good resistance to corrosion even with respect to moist pure oxygen and pure hydrogen.

BRIEF DESCRIPTION OF THE DRAWINGS

The FIGURE diagrammatically depicts a section through a low-temperature fuel cell 1.

DETAILED DESCRIPTION OF THE PREFERRED EMBODIMENTS

An exemplary embodiment of the invention is explained with reference to a FIGURE. The FIGURE diagrammatically depicts a section through a low-temperature fuel cell 1, which includes an electrolyte electrode assembly 3 and two interconnector plates 5 which adjoin the electrolyte electrode assembly 3. The electrolyte electrode assembly 3 includes an anode 7, an electrolyte 9 and a cathode 11. The electrolyte electrode assembly 3 and the interconnector plates 5 are mounted in seals 13. The interconnector plates 5 each include two metal sheets 15, 17, which between them form a cavity 19. Adjacent to the low-temperature fuel cell 1 there is a further low-temperature fuel cell, which likewise comprises an electrolyte electrode assembly 20 with two electrodes 21.

The two metal sheets 15, 17 of the interconnector plates 5 each contain 57% of nickel, 16% of molybdenum, 15% of chromium, 5% of iron, 4% of tungsten, 1.5% of cobalt, 0.5% of manganese and 1% of other metals and impurities. The two metal sheets 15 and 17 of the interconnector plates 5 are substantially 0.15 mm thick and provided with stamped portions 22 over their entire surface. The two metal sheets 15, 17 are welded together within the outer seals 13 of the low-temperature fuel cell 1.

The low-temperature fuel cell 1 is a polymer electrolyte membrane fuel cell (PEM fuel cell) which is designed to be operated with pure oxygen and pure hydrogen as operating gases. While the low-temperature fuel cell 1 is operating, humidified hydrogen flows into the anode gas space 23 of the low-temperature fuel cell 1, which is arranged between the anode 7 and the metal sheet 17 of one of the interconnector plates 5. Moreover, oxygen which has been humidified with water flows into the cathode gas space 25 of the low-temperature fuel cell 1, which is arranged between the cathode 11 and the metal sheet 15 of the other of the two interconnector plates 5.

While the low-temperature fuel cell 1 is operating, cooling water flows out of an axial passage 27, in the direction of flow 29, into the cavity 19 of the interconnector plates 5, in order to dissipate the heat of reaction. The heat of reaction flowing into the cavity 19 through the metal sheets 15, 17 is absorbed by the cooling water, which then flows onward in the direction of flow 19 into a further axial passage 31 and from there is discharged from the fuel cell. The metal sheets 15, 17 of the interconnector plate 5 are highly resistant to corrosion from humidified hydrogen and humidified oxygen even at a temperature of up to 200° C. Moreover, they can be deformed without being damaged and are sufficiently elastic to withstand a pressure difference of up to 10 bar between the operating gas spaces 23, 25 and the cavities 19.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A low-temperature fuel cell, comprising:
an electrode;
an interconnector plate, which electrically connects the electrode to an electrode of an adjacent low-temperature fuel cell, wherein the interconnector plate contains 50 to 65% by weight of Ni, 12 to 22% by weight of Cr. 10 to 18% by weight of Mo, 4 to 10% by weight of Fe and 0.5 to 5% by weight of W.

2. The low-temperature fuel cell as claimed in claim 1, wherein the interconnector plate includes two metal sheets which form a cavity.

3. The low-temperature fuel cell as claimed in claim 2, wherein the metal sheets have a thickness of between 0.08 mm and 0.3 mm in the region of the cavity.

4. The low-temperature fuel cell as claimed in claim 1, wherein low-temperature fuel cell is suitable for operation with pure oxygen and pure hydrogen.

5. The low-temperature fuel cell as claimed in claim 2, wherein the low-temperature fuel cell is suitable for operation with pure oxygen and pure hydrogen.

6. The low-temperature fuel cell as claimed in claim 3, wherein the low-temperature fuel cell is suitable for operation with pure oxygen and pure hydrogen.

7. The low-temperature fuel cell as claimed in claim 4, wherein the low-temperature fuel cell is suitable for operation with pure oxygen and pure hydrogen.

8. The low-temperature fuel cell as claimed in claim 1, further comprising a second interconnector plate.

9. The low-temperature fuel cell as claimed in claim 1, wherein the interconnector plate is mounted in at least one seal.

10. The low-temperature fuel cell as claimed in claim 2, wherein the interconnector plate is mounted in at least one seal.

11. The low-temperature fuel cell as claimed in claim 8, wherein the interconnector plates are mounted in a pair of seals.

12. The low-temperature fuel cell as claimed in claim 2, wherein the two metal sheets are welded together within outer seals of the low-temperature fuel cell.

13. The low-temperature fuel cell as claimed in claim 3, wherein the two metal sheets are welded together within outer seals of the low-temperature fuel cell.

14. A fuel cell, comprising:
an interconnector plate, adapted to electrically connect an electrode of the fuel cell to an electrode of an adjacent fuel cell, wherein the interconnector plate contains 50 to 65% by weight of Ni, 12 to 22% by weight of Cr, 10 to 18% by weight of Mo, 4 to 10% by weight of Fe and 0.5 to 5% by weight of W.

15. The fuel cell as claimed in claim 14, wherein the interconnector plate includes two metal sheets which form a cavity.

16. The fuel cell as claimed in claim 15, wherein the metal sheets have a thickness of between 0.08 mm and 0.3 mm in the region of the cavity.

17. The fuel cell as claimed in claim 14, wherein the fuel cell is suitable for operation with pure oxygen and pure hydrogen.

18. The fuel cell as claimed in claim 14, further comprising a second interconnector plate.

19. The fuel cell as claimed in claim 14, wherein the interconnector plate is mounted in at least one seal.

20. The fuel cell as claimed in claim 15, wherein the interconnector plate is mounted in at least one seal.

21. The fuel cell as claimed in claim 18, wherein the interconnector plates are mounted in a pair of seals.

22. The fuel cell as claimed in claim 15, wherein the two metal sheets are welded together within outer seals of the fuel cell.

23. The fuel cell as claimed in claim 16 wherein the two metal sheets are welded together within outer seals of the fuel cell.

24. A fuel cell, comprising:

an electrode assembly; and an interconnector plate, adapted to electrically connect the electrode assembly to an electrode of an adjacent fuel cell, wherein the interconnector plate contains 50 to 65% by weight of Ni, 12 to 22% by weight of Cr, 10 to 18% by weight of Mo, 4 to 10% by weight of Fe and 0.5 to 5% by weight of W.

25. The fuel cell as claimed in claim 24, wherein the interconnector plate includes two metal sheets which form a cavity.

26. The fuel cell as claimed in claim 25, wherein the metal sheets have a thickness of between 0.08 mm and 0.3 mm in the region of the cavity.

27. The fuel cell as claimed in claim 24, wherein the fuel cell is suitable for operation with pure oxygen and pure hydrogen.

28. The fuel cell as claimed in claim 24, further comprising a second interconnector plate.

29. The fuel cell as claimed in claim 24, wherein the electrode assembly includes an anode, an electrolyte and a cathode.

30. The fuel cell as claimed in claim 24, wherein the interconnector plate is mounted in at least one seal.

31. The fuel cell as claimed in claim 25, wherein the interconnector plate is mounted in at least one seal.

32. The fuel cell as claimed in claim 23, wherein the interconnector plates are mounted in a pair of seals.

33. The fuel cell as claimed in claim 25, wherein the two metal sheets are welded together within outer seals of the fuel cell.

34. The fuel cell as claimed in claim 26, wherein the two metal sheets are welded together within outer seals of the fuel cell.

* * * * *